Nov. 19, 1929.  H. D. ELSE  1,736,037
ROLLER BEARING
Filed June 4, 1927
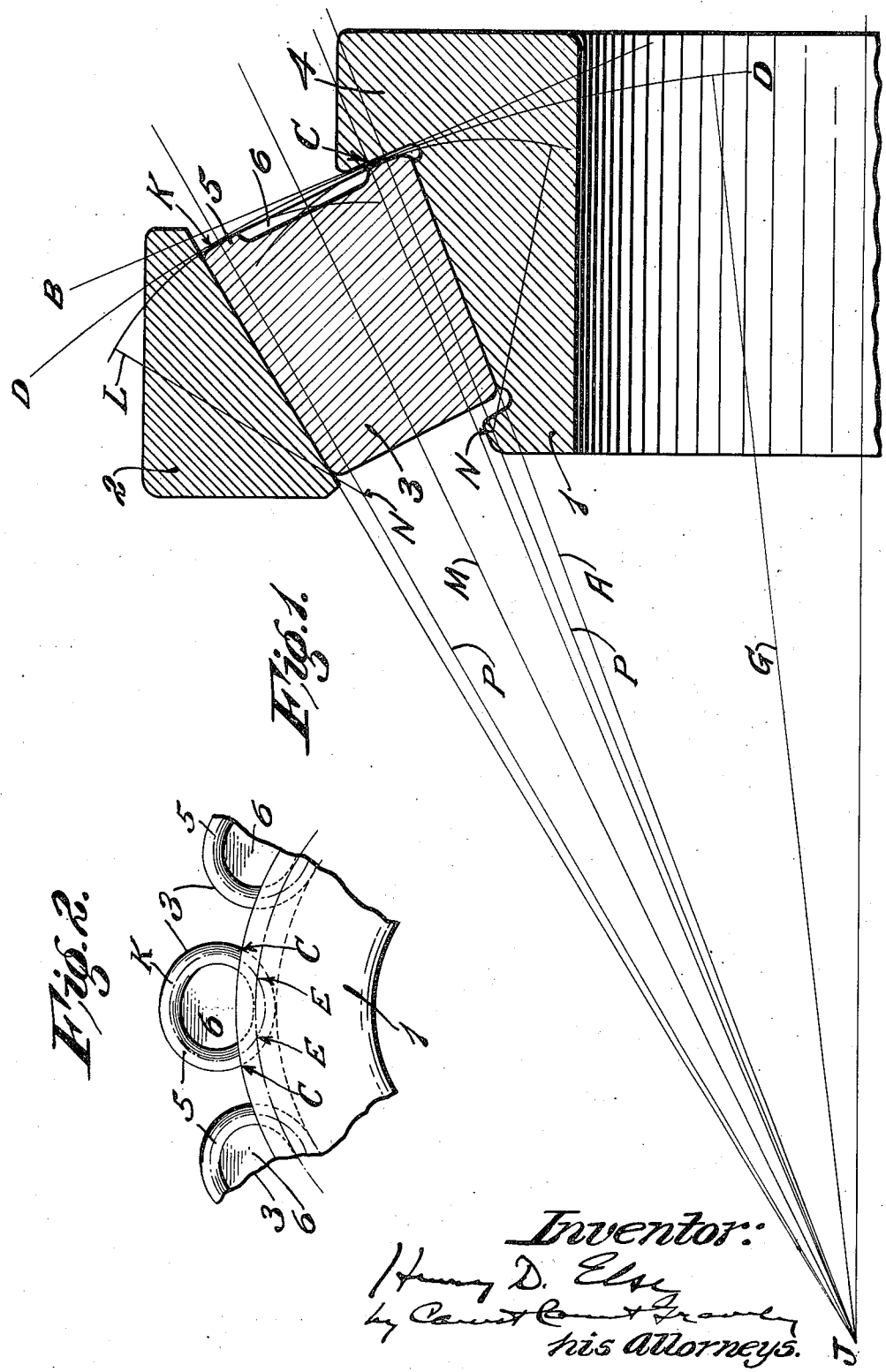

Patented Nov. 19, 1929

1,736,037

UNITED STATES PATENT OFFICE

HARRY D. ELSE, OF SPRINGFIELD, MASSACHUSETTS, ASSIGNOR TO THE TIMKEN ROLLER BEARING COMPANY, OF CANTON, OHIO, A CORPORATION OF OHIO

ROLLER BEARING

Application filed June 4, 1927. Serial No. 196,432.

This invention relates to roller bearings and particularly to roller bearings of the type illustrated in U. S. patent to Neal 1,258,634, dated March 5, 1918. Bearings of this type have important advantages but, on account of the nature of the contact between the large ends of the rollers and the thrust rib of the cone, the lubrication thereof is unsatisfactory and there is a tendency for the roller and rib to wear more rapidly than is desirable. The principal object of the present invention is to provide for satisfactory lubrication and reduce wear and still obtain advantages characteristic of the Neal type of bearing. The invention consists principally in forming the outer end of the roller with an annular extension or thrust band of longitudinally convex section with a central recess as hereinafter described; it also consists in the parts and in the combination and arrangement of parts hereinafter described and claimed.

In the accompanying drawing which forms part of this specification and wherein like numerals refer to like parts wherever they occur, Fig. 1 is a longitudinal cross sectional view of part of a roller bearing embodying my invention; and Fig. 2 is an end view of a portion of the cone with the bearing rollers indicated thereon.

The present bearing comprises a cone or inner raceway member 1, a cup or outer raceway member 2 of common construction concentric with said cone, and a series of conical rollers 3 interposed between the cup and the cone. The cone has a thrust rib 4 at its large end, which rib is undercut to form a face of generally conical form. The angle formed by the intersection of an element A of the bearing cone and an element B of the conical face of the rib is approximately a right angle but preferably slightly less than a right angle. If the end of the roller were a plane surface and the face of the rib truly conical, the contact between them would be at two points C, C, both of which would be at the edge of the roller and at the edge of the rib, both of said points lying in the same circular arc D described from the apex J of the bearing as its center. According to the present invention, the marginal portion of the end of the roller is formed into a convex annular thrust band or low rib 5, and the edge of the roller is rounded off so as, in effect, to reduce the width of the conical surface of the thrust band or rib and the effective diameter of the end of the roll. The contact points of the roller are thus shifted inwardly towards its axis, and the points of contact of the cone are shifted inwardly toward its axis, their new location being indicated at E, E.

In the manufacture of the roller, the end is first formed with a central recess 6 and the remaining portion is formed with a spherical surface of such radius G that, when the parts of the bearing are assembled, the center of such spherical surface will approximately coincide with the apex J of the bearing. The sides of such rib are then ground off into spherical zones K of shorter radius L. This operation may be effected by a flat grinding wheel swung transversely of the axis of the roller, while the roller itself is being rotated on its axis M. The pivot point N for this transverse movement of the grinding wheel should be located fairly close to the short end of said roller and approximately in a line P extending through the apex J of the roller and about midway of the width of the end rib thereof. It is understood that the rollers are completed before being assembled and that the duplication of the line P and pivot point N in the drawing does not imply a shifting of such pivot point but only the rotation of the roller on its own axis. The result of this operation is not merely to produce favorable conditions for contact between the end of the roller and the thrust rib of the cone but also to produce conditions whereby the rollers act to positively propel the lubricant toward the points where needed.

What I claim is:

1. A roller bearing comprising a bearing cone having a thrust rib at its large end, a bearing cup, and a series of rollers between said cone and said cup, the bearing surface of said thrust rib being slightly undercut and the end of each roller having an annular rib of longitudinally convex section whose center of curvature is fairly close to the smaller end of the roller in a line extending through the crest of said rib and the apex of the bearing.

2. A roller bearing comprising a bearing cone having a thrust rib at its large end that makes an angle to the main bearing surface slightly less than a right angle, a bearing cup, and a series of rollers between said cone and said cup, the end of each roller having a central recess and an annular rib of convexly curved section surrounding the same whose center of curvature is fairly close to the smaller end of the roller in a line extending through the crest of said rib and the apex of the bearing, the edge portion of said roller exterior to said rib being radiused with a radius of curvature that is shorter than the radius of convex curvature of said annular rib.

3. A roller bearing comprising a bearing cone having a thrust rib at its large end that makes an angle to the main bearing surface slightly less than a right angle, a bearing cup, and a series of rollers between said cone and said cup, each roller having the marginal portion of its large end formed into an annular extension, whose side surfaces inside and outside of its band of contact are surfaces of revolution of a curved arc of shorter radius than the distance from said band to the apex of the bearing.

Signed at Springfield, Massachusetts, this 14th day of May, 1927.

HARRY D. ELSE.